Nov. 10, 1931.   S. S. FURRER   1,830,993
CENTRALIZING DRAFT CONNECTION FOR AGRICULTURAL VEHICLES
Filed Sept. 30, 1929   4 Sheets-Sheet 3

INVENTOR:
Samuel S. Furrer.,
BY
Attorney.

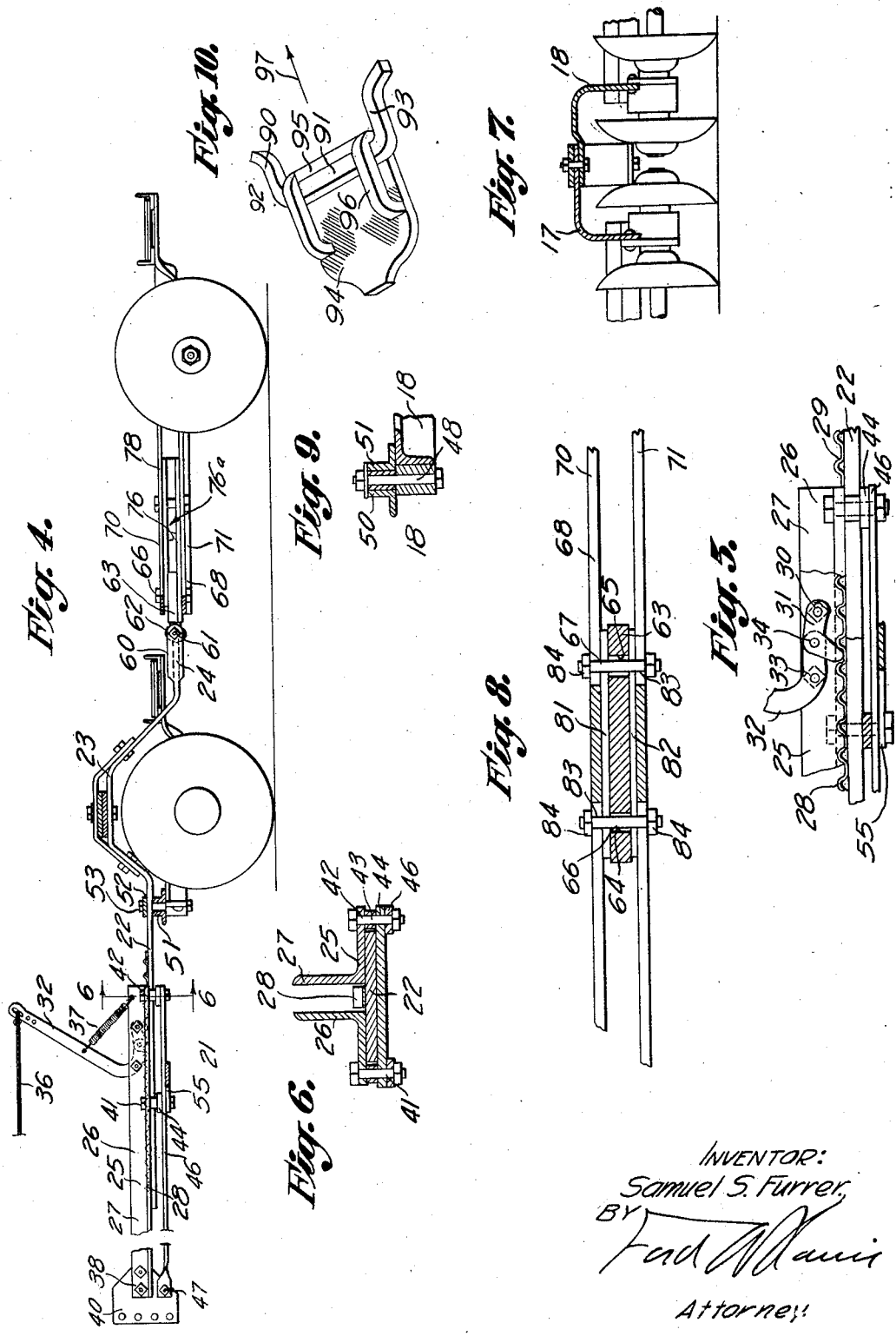

Patented Nov. 10, 1931

1,830,993

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

CENTRALIZING DRAFT CONNECTION FOR AGRICULTURAL VEHICLES

Application filed September 30, 1929. Serial No. 396,029.

My invention relates to agricultural implements and particularly to that class of implements adapted to be pulled by a power device such as a tractor. In many agricultural implements the ground working tools are divided into gangs, one of which follows the other. Each gang or set of tools is held in a framework, and the frameworks are connected together in a flexible manner so as to permit each gang of tools to assume a desired working position relative to the ground, even though the ground should be uneven, and so that the frames or supporting structures can swing relative to one another on a vertical axis to enable the agricultural implement to be readily turned.

It is found that the digging into the ground by the tools on one side of the following gang of tools will cause the following gang of tools to swing to the side and to follow along behind the leading gang in a disaligned position.

It is an object of the invention to provide an interconnecting draft device which is so constructed that when the following section of such an implement is swung to the side, forces will be exerted thereon by the draft member tending to move the following section back into centralized position relative to the leading section and to maintain the following section in such centralized position.

A further object of the invention is to provide a draft member of the above character which may be readily applied to various types of implements or vehicles in which one member or device is pulled by another member or device.

In the following part of the specification the invention is disclosed in use with an agricultural implement in the form of a disc harrow, but it is not in any way limited to such use for there are many other agricultural implements, road working tools, and vehicle combinations in which one member is pulled by another member, or where several members are pulled in consecutive following positions, one member being pulled by draft connection to the preceding member.

It is an object of the invention to provide a disc harrow in which the rear gangs of the rear section are controlled by the gangs of the front section and in which the rear or following section is pulled by the front or leading section through a centralizing draft device which will tend to hold the sections centralized but will not interfere with the controlling of the rear gangs by the front gangs.

Further objects and advantages of the invention will be made evident throughout the following part of the specification.

Referring to the drawings which are for illustrative purposes only,

Fig. 4 is a section taken on the line 4—4 of Fig. 1.

Fig. 5 is an enlarged fragmentary sectional view showing the details of the latch mechanism employed at the forward end of the leading section of the harrow.

Fig. 6 is an enlarged cross section on a plane represented by the line 6—6 of Figs. 1 and 4.

Fig. 7 is a fragmentary section on a plane represented by the line 7—7 of Fig. 1.

Fig. 8 is an enlarged section on a plane represented by the line 8—8 of Fig. 1, showing constructional details of my new centralizing draft device.

Fig. 9 is an enlarged fragmentary section taken as indicated by the line 9—9 of Fig. 1.

Fig. 10 is a fragmentary perspective view showing an alternative form of centralizing draft means.

The type of harrow employed in this present disclosure is fully set forth in U. S. Letters Patent No. 1,621,622, issued Feb. 2, 1927, to Louis C. Brenneis for Disc harrow.

Figure 1:
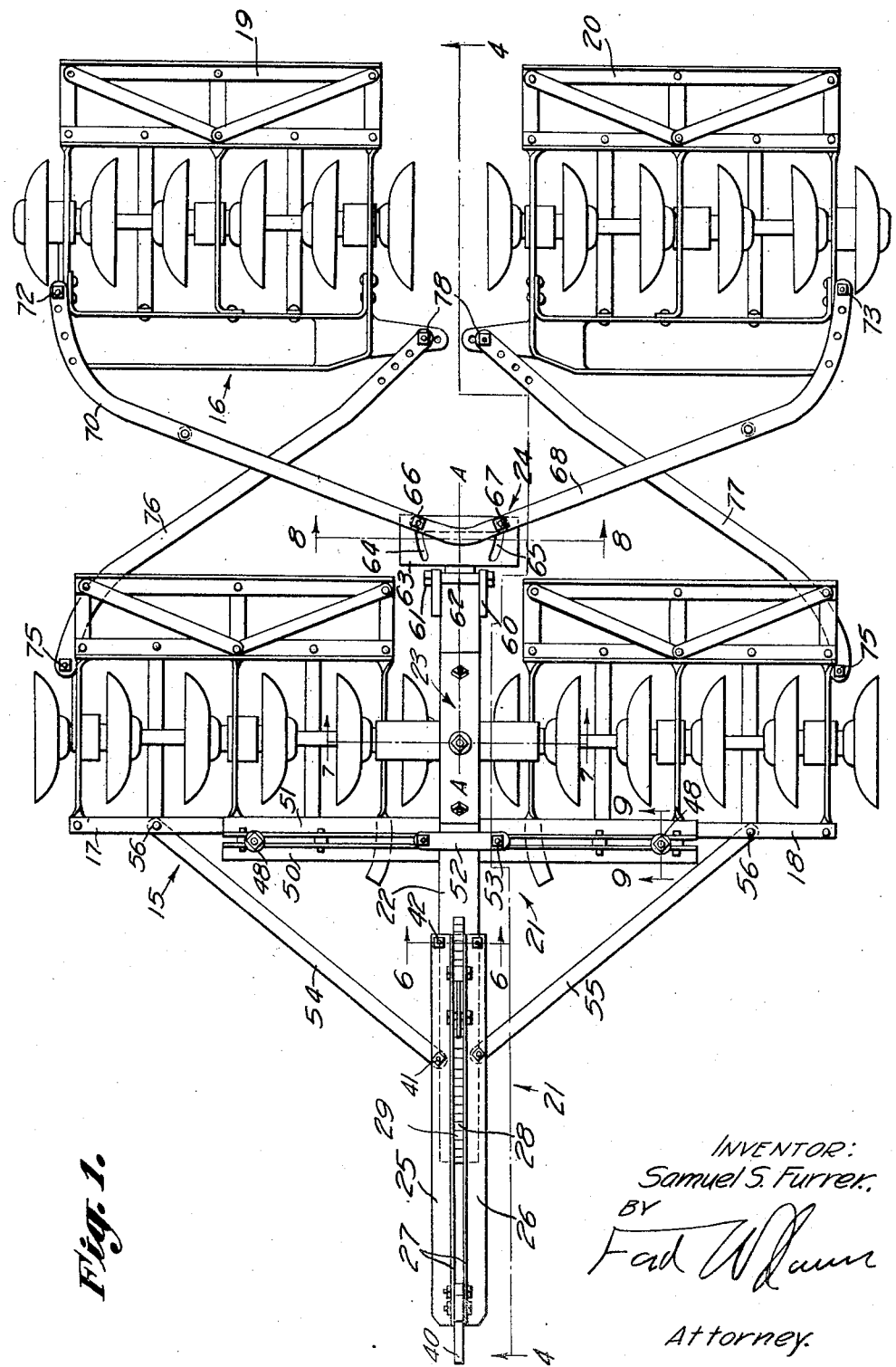
Fig. 1 is a plan view of an agricultural implement consisting of a disc harrow, this view showing the gangs of the harrow in non-working position.

In Fig. 1 of the drawings I show an agricultural implement in the form of a disc harrow having a leading section 15 and a following section 16, the leading section 15 consisting of harrow units 17 and 18, and the following section 16 consisting of harrow units 19 and 20. The front harrow section is pulled by a draft device 21 which includes a center bar 22, this center bar 22 being provided with a hump formation 23 near its rearward end and a clevis 24 at its rearward end. At the forward end of the bar 22 a sliding head 25 is situated, this sliding head including a pair of angles 26 placed so that their lower legs engage the upper surface of the bar 22 and with their vertically extending legs 27 spaced on either side of a ratchet member 28 which consists of a strip of metal provided with humps 29 in such a manner that the resemblance of ratchet teeth is accomplished, as shown in Fig. 5. By means of a pin or bolt 30, a pawl 31 is pivoted between the vertical legs 27 of the angles 26 in such a manner that it may engage the ratchet member 28. For purpose of lifting the pawl 31 I provide a lever 32 which hinges at 33 on a bolt extending through the vertical legs 27 of the angles 26 and is provided with a pin or other engagement means 34 at its lower extremity which will engage and lift the latch member 31 when it is desired to move the head 25 forwardly on the bar 22.

A rope 36 may be attached to the upper end of the lever 32, this rope extending to a tractor or other vehicle employed to pull the harrow so that the lever may be pulled in forward direction against the tension of a spring 37 by the operator of the tractor. The forward ends of the angles 26 are secured at 38 to a draft plate 40, which draft plate attaches to the tractor. Forward and rearward pairs of bolts 41 and 42 project downwardly from the angles 26 through spacing collars 43, as shown in Fig. 6, through holes provided in the ends of cross bars 44, and through auxiliary or cooperative pull bars 46 which extend forwardly, as shown in Fig. 4, for attachment with the draft plate 40 at 47.

The harrow units 17 and 18 pivot on hinge bolts 48 which are secured near the outer ends of a cross frame 50 consisting of angles 51 which extend across and are secured to the bar 22 by a clamping plate 52 and bolts 53. It will be perceived that through use of the hinge bolts 48 the harrow units 17 and 18 are directly connected to the bar 22. In order to control the swinging of the harrow units 17 and 18 on the pivots provided by the bolts 48 diagonal bars 54 and 55, as shown in Fig. 1, are extended from pivots 56 on the frames of the harrow units 17 and 18 to the forward bolts 41 of the movable head 25, as shown in Fig. 4.

Figure 2:
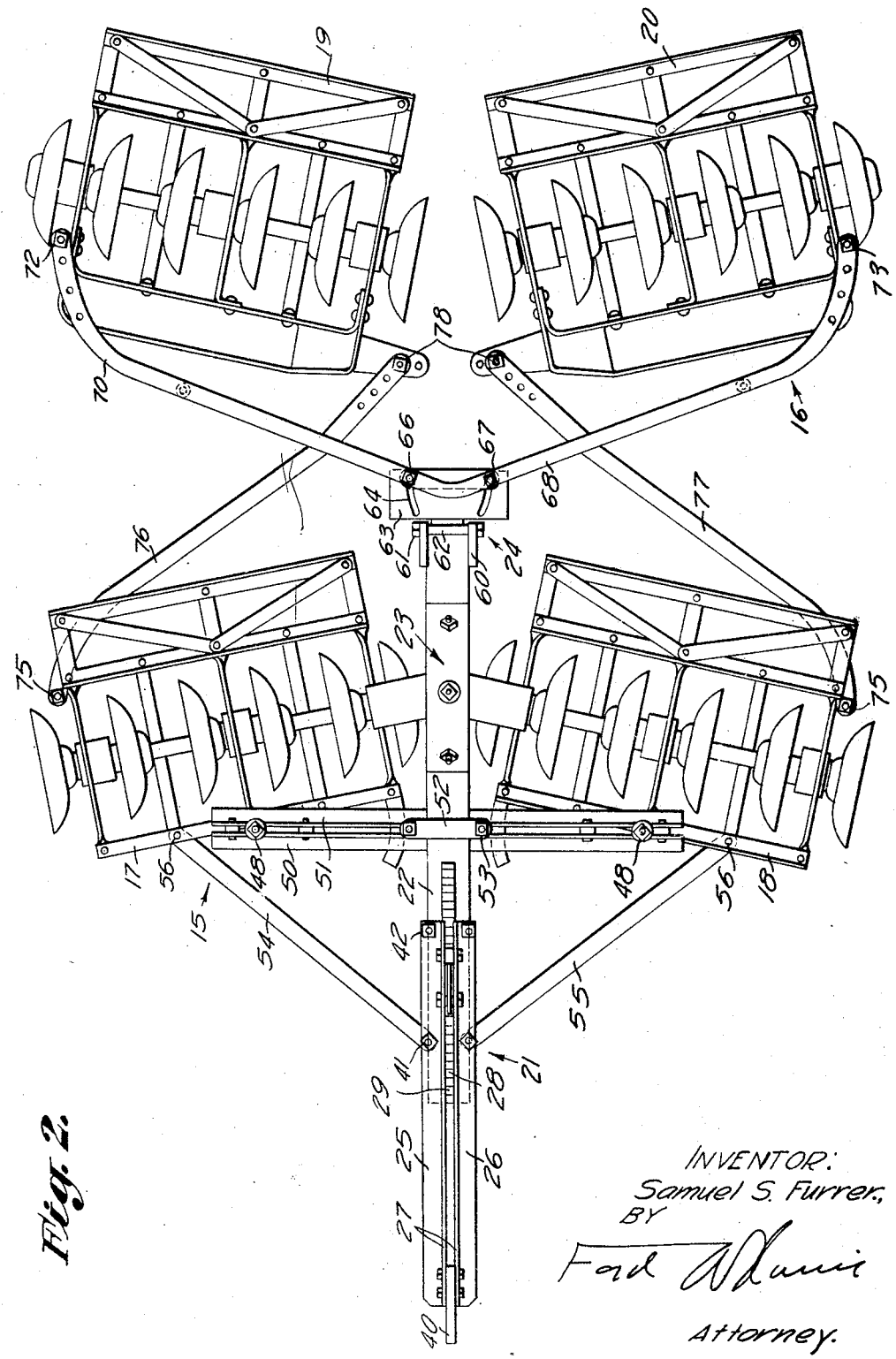
Fig. 2 is a plan view similar to Fig. 1 but showing the gangs in working position and in the positions occupied when the harrow is being pulled along a straight line of travel.

In Fig. 1, the harrow sections or units 17, 18, 19, and 20 are shown in the position assumed when the vehicle is in transit, or in other words, is being moved from one place to another but during such movement is not intended to work the ground passed over. When it is desired to harrow or mull the soil, the harrow is manipulated in such a manner that the units 17, 18, 19, and 20 will assume the diagonal positions shown in Fig. 2. This is accomplished by allowing the head 25 to move forwardly on the bar 22 from the position in which it is shown in Fig. 1 to an advanced position such as shown in Fig. 2, this forward movement of the head 25 being transmitted to the pivots 56 through the diagonal bars 54 and 55, thus causing the outer portions of the harrow units 17 and 18 to swing forwardly on the pivot bolts 48 into diagonal positions such as shown in Fig. 2. This adjustment of the harrow into operating position is accomplished by the driver of the tractor without necessity of stopping the tractor or leaving the seat thereof. The driver or operator, by pulling forwardly on the rope 36, may swing the lever 32 forwardly which will accomplish a lifting of the latch or pawl 31 from disengagement with the ratchet means or leg 28 so as to permit the head 25 to slide forwardly on the bar 22 to any position the operator may desire. When the operator desires to return the harrow units to inoperative position, he merely backs the tractor so as to cause the member 25 to slide rearwardly on the bar 22 to the position shown in Fig. 1.

My present invention consists principally in the manner of attaching the following section consisting of the harrow units 19 and 20 to the leading section 15. In turning an ordinary harrow having leading and following sections, it is sometimes difficult to cause the following section to move back into proper following alignment with the leading section, and also in the ordinary use of a harrow having a leading section and a following section the engagement of the ground by the harrow discs will at times cause the following section to become disaligned. In my new harrow, the pulling forces carried from the leading section to the following section are so transmitted and divided that there will be an ever present condition tending to keep the leading and following sections in alignment.

In Figs. 1 and 4 I show the clevis 24 consisting of side plates 60 which extend rearwardly in such a manner that the rearward ends thereof may receive a lateral horizontal pin 61 which engages a bearing or sleeve portion 62 at the forward end of a draft plate 63. This draft plate 63 has longitudinally directed arcuated slots 64 and 65 cut near the ends thereof. Bolts 66 and 67 extending vertically through the slots 64 and 65 engage a draft yoke 68 which consists of upper and lower flat bars 70 and 71 bent in the manner shown in Fig. 1 and having the rightward and leftward ends thereof pivotally attached by means of bolts 72 and 73 respectively to the harrow units 19 and 20.

From pivots 75 at the outer ends of the harrow units 17 and 18 diagonal bars 76 and 77 extend to pivots 78 at the inner ends of the following harrow units 19 and 20. The bars 76 and 77 pass between the upper and lower bars 70 and 71 of the draft yoke 68, as indicated by the numeral 76a in Fig. 4. The bolts 66 and 67 are centrally enlarged, as shown in Fig. 8, and extend through holes provided in the ends of spacer plates 81 and 82 and through holes 83 in the bars 70 and 71, there being nuts 84 applied to the ends thereof as shown. The pins 66 and 67 may move forwardly in the slots 64 and 65 from the positions in which they are shown in Fig. 1 but cannot move rearwardly by reason of their engagement with the rearward ends of the slots 64 and 65.

When the harrow is pulled straight ahead, both of the pins 66 and 67 will engage the walls forming the rearward ends of the slots 64 and 65 so that the pulling force transmitted from the plate 63 to the yoke 68 will be divided between two points equally spaced in lateral and horizontal direction on each side of the longitudinal center line of the draft plate 63, which center line is also the longitudinal center line of the bar 22, as represented by the line A—A of Fig. 1.

When the head 25 is moved forwardly on the bar 22 so as to swing the harrow units 17 and 18 into diagonal position, such as shown in Fig. 2, the bars or connections 76 and 77 cause the inner ends of the harrow units 19 and 20 to be pulled forwardly, thus swinging the harrow units 19 and 20 into diagonal or operative positions. This adjustment of the harrow units from non-operative to operative position does not affect the position of the secondary draft connection represented by the draft plate 63 and the draft yoke 68, but as long as the harrow is being moved forwardly along a straight line, the pulling force will be transmitted through both of the pins 66 and 67 to the draft yoke 68.

Figure 3:
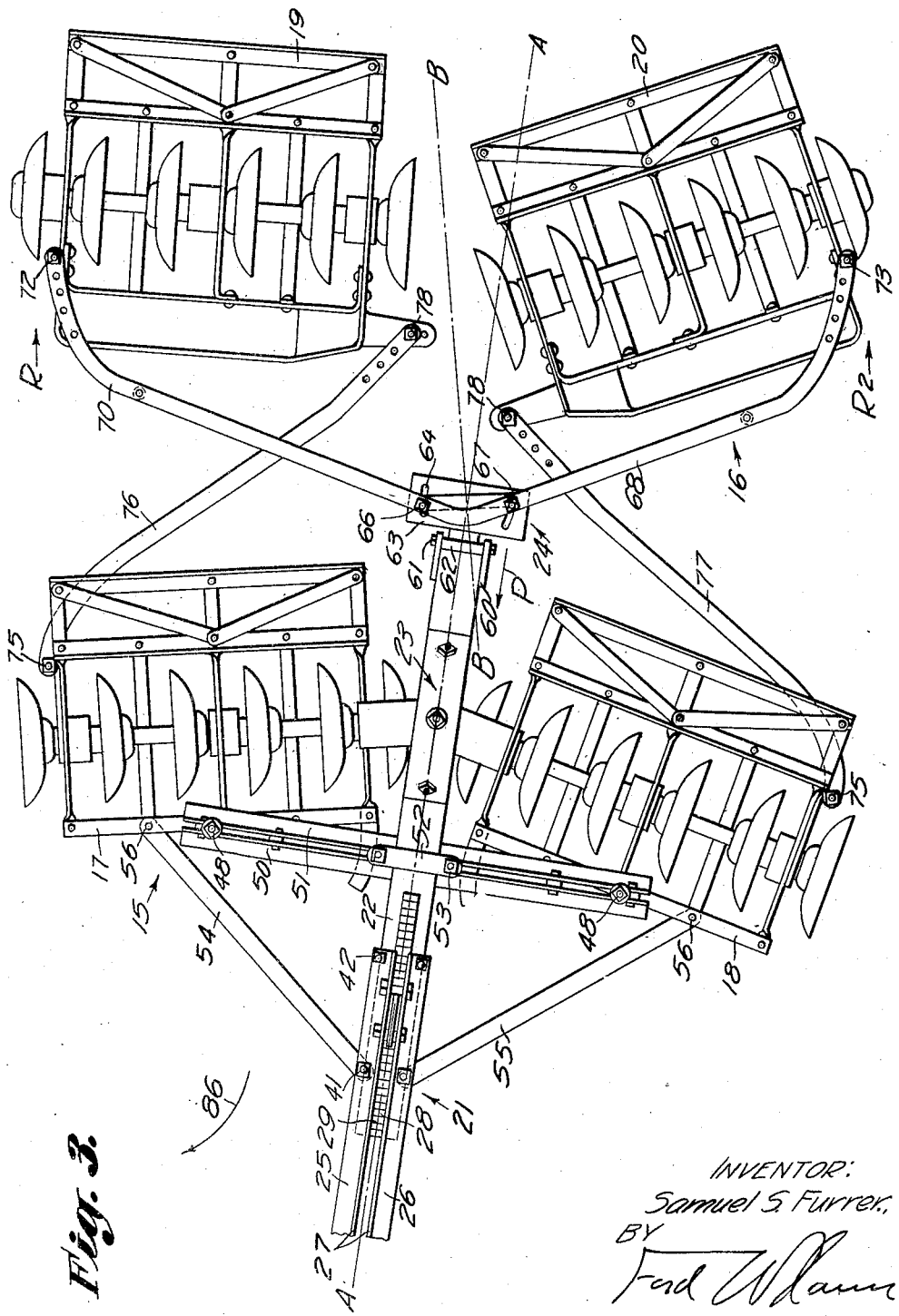
Fig. 3 is a plan view showing the gangs in working position during the turning of the harrow or the movement thereof through a circular path.

A different condition exists when the vehicle is turned or in the event that the following section 16 is caused to swing to the side for any reason. In Fig. 3, the harrow is indicated as turning to the right or in the direction of an arrow 86, with the result that the draft yoke 68 is swung rightwardly so that its axis B—B is inclined relative to the axis A—A of the leading section 15. Owing to the engagement of the pins 66 and 67 with the rearward ends of the slots 64 and 65, the yoke 68 cannot move rearwardly relative to the plate 3; so in order to accomplish the necessary rotation between the members 63 and 68 the pin 66 is swung forwardly in the slot 64 with the result that the entire pull exerted on the frame 68 is through the pin 67 which engages the rear end of the slot 65, this pull or draft force being indicated by the arrow P of Fig. 3.

It will be perceived that at this time the point of pull on the yoke 68 is not disposed centrally between the pivots 72 and 73 at the ends of the member 68 but is closer to the pivot 73. The pull indicated at P is met by two reactions R and $R^2$. It is evident that if the reactions R and $R^2$ are substantially equal, the greater leverage of the reaction R as compared to the reaction $R^2$ when the yoke 68 is in angular position, as shown in Fig. 3, will cause a decided tendency for the right-hand portion of the member 68 to rotate rearwardly about the pin 67, thus causing the axis B—B of the yoke 68 to move toward a position of alignment with the axis A—A. When the yoke 68 reaches centralized position relative to the draft plate 63, the pin 66 will make engagement with the rear end of the slot 64, with the result that the leverage on each side of the yoke 68 will be balanced so long as the reactions R and $R^2$ remain equal. Should the following section 16 consisting of the harrow units 19 and 20 become forced to one side due to any reason, the offset pull in an opposite direction accomplished by the draft structure will cause the yoke 68 to return to centralized position within a minimum period of time. In Fig. 3, the yoke 68 is shown swung or rotated in anti-clockwise direction, and when it is so swung, the pin 67 serves to transmit the entire pull from the draft plate 63 to the yoke 68, producing the centralizing effect previously described.

Should the yoke 68 be swung in clockwise direction from centralized position, the pin 67 will move forwardly in the slot 65 and the draft force will then be transmitted from the plate 63 to the yoke 68 through the pin 66 which will effect a centralizing movement of the yoke 68 in anti-clockwise direction. It will be perceived that as long as the leading and following sections 15 and 16 are centralized no rotative forces will be exerted on the yoke 68, but should the yoke 68 start to deflect from centralized position there will be an immediate establishment of a superior leverage tending to resist deflection of the yoke 68 from centralized position. This valuable result is accomplished through the transmitting of the draft force from the primary portion of the draft device represented by the plate 63 to the secondary portion of the draft device represented by the yoke 68, through two points spaced laterally on opposite sides of the longitudinal center line of the vehicle when moving forwardly along a straight line, this longitudinal center line also being the center line of forces acting within the vehicle when it is being operated.

I have previously described a form of centralizing draft means having two points of engagement between the primary and secondary portions thereof, but it is to be understood that this engagement between the primary and secondary portions is not necessarily confined to two or more points but may be a continuous engagement along a straight line.

In Fig. 10 I show a draft member including a primary portion consisting of a bar 90 having a lateral substantially straight center line portion 91 extended between legs 92 and 93 and a secondary member 94 consisting of a plate having an upwardly bent flange 95 at its forward end, such flange providing a straight inner face against which the bar portion 91 engages. Extending from the ends of the flange 95 are guide loops 96 which extend over the bar portion 91 and permit a limited collapsing movement between the members 90 and 94. When the member 90 is being pulled forwardly along a straight line of movement, as indicated by the arrow 97, the bar portion 91 will make a flat face-to-face engagement with the flange 95 of the member 94; but should the members 90 and 94 become disaligned, the draft engagement will be made at one end or the other of the bar portion 91, thus producing the desired eccentricity, which will accomplish centralization between the leading and following members connected together by such a draft device. It will be perceived that so long as the leading and following members are in alignment, there will be a face-to-face engagement between the members 90 and 94, but should these members become disaligned, a point engagement is immediately effected.

I have herein shown a simple and practical form of my invention, but it is understood that certain parts and elements thereof are representative of other parts, elements, and mechanisms which may be employed in substantially the same manner to accomplish substantially the same results; therefore, it is to be understood that the invention is not to be limited to the details disclosed herein but shall have the scope set forth in the following claims.

I claim as my invention:

1. A device of the character described, including: a primary draft member for attachment to a puller; a leading structure attached to said primary draft member; a following structure; and a secondary draft member connecting between said leading structure and said following structure, said secondary draft member being adapted to bring said following structure into alignment with said leading structure through application of a pulling force to said following structure at one side of the longitudinal center line extending through said secondary draft member, when said following structure has been swung to a side, there being hinge means at one end of said secondary draft member characterized by a horizontal axis for enabling vertical adjustment between said leading and following structures.

2. A device of the character described, including: a primary draft member for attachment to a puller; a leading structure attached to said primary draft member; a following structure; a secondary draft member connecting between said leading structure and said following structure, said secondary draft member including a primary portion and a secondary portion, there being projections extending from said primary portion at points on opposite sides of and spaced from a longitudinal center line, and there being longitudinal slots in said secondary portion receiving said projections; and a hinge at one end of said secondary draft member for permitting vertical adjustment between said leading and following structures.

3. A device of the character described, including: a primary draft member for attachment to a puller; a leading structure attached to said primary draft member; a following structure; a secondary draft member connecting between said leading structure and said following structure, said secondary draft member including a front portion and a rear portion interengaging at points spaced laterally on opposite sides of a common longitudinal center line so that when said following structure is swung to the side the point of pulling engagement between said front and rear portions will lie to a side of said longitudinal center line whereby the pulling force from said leading structure and through said secondary draft member to said following structure will become eccentric in a manner to cause said following structure to swing toward a position of alignment; and a hinge at one end of said secondary draft member for permitting vertical adjustment between said leading and following structures.

4. For use in an agricultural vehicle having a leading structure and a following structure adapted to be pulled behind said leading structure: a draft connection adapted to be placed between said leading and following structures, said draft connection including a front portion and a rear portion interengaging at points spaced laterally on opposite sides of a common longitudinal center line so that when said following structure is swung to the side, the point of pulling engagement between said front and rear portions will lie to a side of said longitudinal center line, whereby the pulling force from said leading structure and through said draft connection to said following structure will become eccentric in a manner to cause said following structure to swing toward a position of alignment; and a horizontal hinge at one end of said draft connection for securing it to one of said structures.

5. For use in an agricultural vehicle having a leading structure and a following structure adapted to be pulled behind said leading structure: a draft member connecting between said leading structure and said following structure, said draft member including a primary portion and a secondary portion, there being projections extending from said primary portion at points on opposite sides of and spaced from a longitudinal center line, and there being longitudinal slots in said secondary portion receiving said projections; and a hinge on said draft member for permitting vertical adjustment between said leading and following structures, said hinge being adapted to be secured to one of said structures.

6. For use in an agricultural vehicle having a leading structure and a following structure adapted to be pulled behind said leading structure: a draft member connecting between said leading structure and said following structure, said draft member being adapted to bring said following structure into alignment with said leading structure through application of a pulling force to said following structure at one side of the longitudinal center line extending through said draft member, when said following structure has been swung to a side, there being hinge means at one end of said draft member characterized by a horizontal axis for enabling vertical adjustment between said leading and following structures.

In testimony whereof, I have hereunto set my hand at Oxnard, California, this 23d day of September, 1929.

SAMUEL S. FURRER.